US011247562B2

(12) United States Patent
De Lemos

(10) Patent No.: US 11,247,562 B2
(45) Date of Patent: Feb. 15, 2022

(54) POWER TRANSMISSION ASSEMBLY FOR TANDEM AXLES

(71) Applicant: IVECO S.P.A., Turin (IT)

(72) Inventor: José Francivaldo Peira De Lemos, Sete Lagoas (BR)

(73) Assignee: IVECO S.P.A., Turin (IT)

( * ) Notice: Subject to any disclaimer, the term of this patent is extended or adjusted under 35 U.S.C. 154(b) by 223 days.

(21) Appl. No.: 16/469,258

(22) PCT Filed: Dec. 12, 2017

(86) PCT No.: PCT/BR2017/050377
§ 371 (c)(1),
(2) Date: Jun. 13, 2019

(87) PCT Pub. No.: WO2018/107256
PCT Pub. Date: Jun. 21, 2018

(65) Prior Publication Data
US 2020/0016978 A1    Jan. 16, 2020

(30) Foreign Application Priority Data

Dec. 14, 2016  (BR) .......................... 10 2016 029390 1

(51) Int. Cl.
*B60K 23/08* (2006.01)
*B60K 17/04* (2006.01)
*B60K 17/36* (2006.01)
*B60K 23/04* (2006.01)
*B62D 61/02* (2006.01)

(52) U.S. Cl.
CPC ........ *B60K 23/0808* (2013.01); *B60K 17/046* (2013.01); *B60K 17/36* (2013.01); *B60K 23/04* (2013.01); *B62D 61/02* (2013.01); *B60K 2023/046* (2013.01)

(58) Field of Classification Search
CPC .. B60K 23/0808; B60K 17/046; B60K 17/36; B60K 23/04; B60K 2023/046; B60K 23/08; B60K 17/346; B62D 61/02
See application file for complete search history.

(56) References Cited

U.S. PATENT DOCUMENTS

| 2,174,187 A | 9/1939 | Freitag |
| 4,050,534 A | 9/1977 | Nelson et al. |
| 5,404,963 A | 4/1995 | Crepas et al. |

(Continued)

FOREIGN PATENT DOCUMENTS

| EP | 2574489 A1 | 4/2013 |
| EP | 2574490 A2 | 4/2013 |

(Continued)

*Primary Examiner* — Justin Holmes
(74) *Attorney, Agent, or Firm* — Leason Ellis LLP

(57) ABSTRACT

A power transmission assembly for tandem axles of a vehicle, the assembly including an input axle, a first drive axle, a second drive axle, a plurality of engagement/disengagement devices, a locking device, and a differential unit. The differential unit being set for power distribution between the drive axles of the vehicle, from which, in cooperation with the engagement/disengagement devices and the locking device, enables configurations of the drive axles in which the first and the second drive axles are driven, one of the drive axles is driven and the other drive axle is not driven, or all the drive axles are not driven.

17 Claims, 8 Drawing Sheets

(56) References Cited

U.S. PATENT DOCUMENTS

| | | | |
|---|---|---|---|
| 5,860,889 A * | 1/1999 | Schlosser | B60K 23/08 |
| | | | 475/221 |
| 5,950,750 A * | 9/1999 | Dong | B60K 23/08 |
| | | | 180/24.09 |
| 7,059,215 B1 * | 6/2006 | Ziech | F16H 57/023 |
| | | | 180/24.11 |
| 8,398,520 B1 | 3/2013 | Bassi et al. | |
| 8,562,479 B2 | 10/2013 | Hamperl et al. | |
| 8,651,994 B2 | 2/2014 | Bassi et al. | |
| 2006/0272866 A1 | 12/2006 | Ziech | |
| 2015/0072826 A1 | 3/2015 | Dubey et al. | |

FOREIGN PATENT DOCUMENTS

| | | |
|---|---|---|
| GB | 2066182 A | 7/1981 |
| WO | 2004063599 A1 | 7/2004 |

\* cited by examiner

POWER TRANSMISSION ASSEMBLY FOR TANDEM AXLES

FIELD OF THE INVENTION

The present invention relates to a new power transmission assembly for tandem axles, such as of the tandem or tridem type, typically used in heavy vehicles for transporting goods.

Particularly, the power transmission assembly for tandem axles, related to the present invention, comprises systems capable of disengaging the traction of the axles in order to enable the disengaged axle to lift and, therefore, to promote the reduction of fuel and tires consumption, the expenses with preventive and corrective maintenances during the vehicles maintenance and, in some cases, the money-saving with tolls and taxes related to vehicles' running on motorways and, finally, it also enables a means of safety for the vehicle.

BACKGROUND OF THE INVENTION

According to the prior art, and as it might be known by those skilled in the art, numerous models of vehicles that comprise combined traction axles of the tandem type are known, for example, those so-called 6×4, 8×4, 10×4, i.e., out of six, eight or ten contact points, four have motive traction for providing the vehicle movement. Furthermore, there are those ones known as tridem, in which there are three tag axles interconnected disposing six contact points. Conventionally, these four or six contact points are formed by the tires and wheels of an assembly of combined traction axles of the tandem or tridem type.

In this context, it is noted that this kind of transmission assembly formed by tandem axles, being the tandem or tridem type, is well known in the prior art and, for many years, have been used in vehicles for goods transportation, such as the so-called "truck", heavy trucks and the two-axle trucks which have the said tandem axle with the objective of increasing the load capacity and providing a better vehicle performance. Such traction assemblies are also used in military and special vehicles, such as construction, mining machinery, etc.

According to the prior art, although these assemblies of tandem axles are able to increase the loading capacity and improve the performance of the load transportation vehicles, these advantages are only valued when the vehicle is transporting the goods, i.e., during the movement of goods delivery.

One of the main inconveniences lies exactly in the fact that the vehicle moves unloaded on motorways, i.e., after delivering the goods. This is because, besides the fuel consumption, there is the mechanical parts, engine and tires wear and tear, making the vehicle, as a whole, to be used without a direct compensation on such movements and, consequently, resulting in losses for the fleet owner. Furthermore, the contact of the tires with asphalt results in friction increase and, therefore, requires a greater effort from the vehicle, leading to a higher fuel consumption during movements.

With the purpose of minimizing such losses, especially during the movements in which the vehicle is not transporting goods, mechanisms that provide the lifting of some drive axles have been developed, reducing the number of tires in contact with the ground and, thus, providing the reduction of tires wear and tear, fuel consumption and, also, reducing the efforts and wear and tear of the mechanical parts, for instance, in the suspension and brake sets of the vehicles.

In the case of tandem axles, either of traction or simple running, the lifting of one of the axles can represent a substantial savings in the maintenance costs, as well as in the fuel consumption. Considering that it refers to half of the tires in contact with the ground, savings of almost 50% can be achieved in the set of tires wear and tear and 5% in the fuel consumption.

Additionally, as it occurs in some motorways, the toll rates are charged based on the number of axles having tires in contact with the asphalt. Thus, the lifting of one or some of the axles provides the driver with considerable savings in the paid taxes during his movements without transported load.

Regarding the tag axles of tandem or tridem type, there is the need of providing the disengagement or deactivating, in some way, the traction in the axle that will be lifted, since it could not be driven if it were not in contact with the ground, since all the traction would be transferred to the axle that is not in contact with the ground.

The prior art discloses a few solutions for disengaging the traction of a tag axle of tandem type, such as disclosed in the document PCT/BR2016/050182, of CNH Industrial Latin America Ltda., incorporated to the present document for reference purposes.

Although the known solutions in the prior art meet the traction needs required, it should be noted that the disclosed teachings are restricted to a specific disengagement condition, which is interrupting the traction of only one axle.

Thus, considering the previously disclosed information, it becomes possible to state that the assemblies of combined traction axles of the tandem or tridem type, used in vehicles for heavy loads transportation lack solutions effectively capable of obtaining a resolution in order to provide the choice of which axle the driver should promote the disengagement and, also, cannot obtain the full disconnection of the traction in the axles of a same assembly.

SUMMARY OF THE INVENTION

Considering the above-mentioned scenario, it is one of the main objectives of the present invention to provide an assembly of power transmission for tandem axles of tandem or tridem type which has been specifically developed and projected to obtain a practical and functional solution to the problems, limitations and inconveniences caused by the tandem axles known in the prior art, such as the ones previously exemplified.

More specifically, it is one of the objectives of the present invention to provide an assembly of power transmission for tandem axles comprising technical, constructive and functional features that enable the effective disconnection of the traction axles according to the vehicle driver's will and interest and, thus, providing a substantial increase in the savings and conservation of the assembly, especially in the tires, in the mechanical components and, thus, in the fuel consumption. Therefore, it enables the vehicles drivers to determine which traction axle they wish to disengage and, thus, providing the rotation scheme in the axles lifting, in order to increase the tires and the parts useful life, and reducing the vehicle maintenance costs in general.

Furthermore, another objective of the present invention is to provide a drive system for a power transmission assembly comprising a combination of features capable of enabling the handling of the work configuration of the drive axles of a vehicle.

It is also an objective of the present invention to provide a vehicle for goods transportation which comprises a power transmission assembly for tandem axles of the tandem or tridem type having a drive system, as previously specified.

Thus, in light of the foregoing, in order to achieve the objectives and technical and functional effects indicated above, amongst others, the present invention comprises a power transmission assembly for tandem axles, preferably for vehicle models having axles of the tandem or tridem type, also comprising an input axle in which a differential unit is set in order to promote the power distribution between the drive axles of said vehicle, from which, in cooperation with engagement/disengagement devices and locking device, handles the configuration of the drive axles, between a configuration in which the first and the second drive axles are driven, a drive axle is driven and the other drive axle is not driven, or all the drive axles are not driven.

According to an embodiment of the present invention, the power transmission assembly for tandem axles comprises an input axle upon which a differential unit is connected, which is formed by a housing that covers a planetary yoke freely arranged in relation to the axle of said yoke and in contact with the intermediate sun gears which are adjacently placed, respectively, to the transmission and connection gears of the transmission assembly. Said transmission gear is freely supported on the input axle and is connected to the external diameter of the transfer gear supported on the axle that comprises the power transmission pinion of the drive axle ring (R). However, the connection gear is set freely on the input axle and is attached to the output axle. Both transmission and connection gears are interconnected and locked through engagement/disagreement devices, and locking device.

Furthermore, according to another embodiment of the power transmission assembly for tandem axles, according to the present invention, said input axle is placed and supported, on one side on roller bearings which are placed on the housing of the transmission assembly, and on the other side on roller bearings placed together with the connection gear, which is also supported in the housing of the transmission assembly through roller bearings. Alternatively, said input axle is supported on lubricated bearings within the housing of said transmission assembly, i.e., without the positioning and requirement of rollers themselves.

According to another embodiment of the present invention, the power transmission assembly for tandem axles comprises engagement/disengagement devices formed by an actuator having an axle provided with a return means, and, additionally, a fork that connects to a sleeve provided with spline within the internal diameter for engaging with the intermediate suns of the assembly, and tines on each one of its lateral faces for interconnections between the transmission and connection gears, and the housing of the differential unit.

Another embodiment of the power transmission assembly for tandem axles, object of the present invention, anticipates a locking device comprising an actuator having an axle provided with a return means and a fork, which is connected to a sleeve provided with spline within the internal diameter for attaching with spline of the input axle, and tines on one of its lateral faces for proper interconnection with the transmission gear.

Furthermore, according to another embodiment of the present invention, the off-state of the engagement/disengagement devices of the power transmission assembly for tandem axles have tines of the lateral sides of said sleeves in contact with the transmission gear and, the other sleeve, in contact with the connection gear. Alternatively, in the off-state, said engagement/disengagement devices have the tines of the lateral sides of said sleeves in contact with the differential unit of the transmission assembly, i.e, an inverted embodiment regarding the conventional operation of said engagement/disengagement devices.

According to an optional embodiment of the present invention, the power transmission assembly for tandem axles comprises a locking device which off-state sets said sleeve in contacts with said transmission gear, i.e., an inverted embodiment regarding the conventional function of said locking device.

According to a said embodiment of the present invention, the actuators of the engagement/disengagement and locking devices are pneumatic and connected to the compressed air system of the vehicle itself. However, alternatively, said actuators may be hydraulic, electrical, electronic or even a combination of these technologies.

Furthermore, as previously disclosed, the present invention also addresses a drive system of a power transmission assembly for tandem axles, such as of the tandem or tridem type, comprised by at least one engagement/disengagement device formed by an actuator working in cooperation with a return element for providing the axial movement of a fork that is connected to a sleeve provided with spline within its connection internal diameter with an intermediate sun gear, and tines on its lateral faces for providing interconnections between the transmission gear and the housing of the differential unit of the power transmission assembly for tandem axles.

According to a said embodiment of the present invention, said drive system of a power transmission assembly for tandem axles comprises, additionally, another engagement/disengagement device and a locking device. Whilst, preferably, this engagement/disengagement device is formed by an actuator working in a cooperative way with a return element responsible for the axial movement of a fork that connects to a sleeve provided with spline within its internal diameter for engaging with an intermediate sun gear, and tines on its lateral faces for providing interconnections between the transmission gear and the housing of the differential unit of the power transmission assembly for tandem axles.

In another embodiment of the drive system of a power transmission assembly for tandem axles, according to the present invention, the locking device is comprised by an actuator working in cooperation with a return element for the axial movement of a fork, which is also connected to a sleeve provided with spline within its internal diameter for engaging with a projected corresponding spline on the input axle, and tines on one of its lateral faces for providing interconnection with the transmission gear of the power transmission assembly for tandem axles.

Finally, the present invention also addresses a vehicle for goods transportation that comprises at least an assembly of tandem axles of the tandem or tridem type, which are formed by drive axles responsible for supporting the wheels with the tires of the vehicle, and are driven by said power transmission assembly for tandem axles with a drive system, as previously disclosed. More specifically, said vehicle for transportation may be a truck, heavy trucks, or two-axle trucks provided with combined traction axles of the tandem or tridem type.

BRIEF DESCRIPTION OF THE DRAWINGS

The features, advantages and technical effects of the present invention, as previously indicated, will become more apparent and the invention will be better understood by reference to the following description of embodiments of the invention taken in conjunction with the accompanying drawings, wherein.

DETAILED DESCRIPTION OF THE INVENTION

The invention is now disclosed according to its particular embodiments making reference to the accompanying drawings of embodiment's examples. The reference numbers indicated in the FIGS. are repeated throughout the different views in order to indicate identical or similar technical features. Furthermore, the terms possibly used herein such as: above, below, top, bottom, lateral, right, left, front, back and their variations must be interpreted according to the guidance given in FIG. 1.

Figure 1:
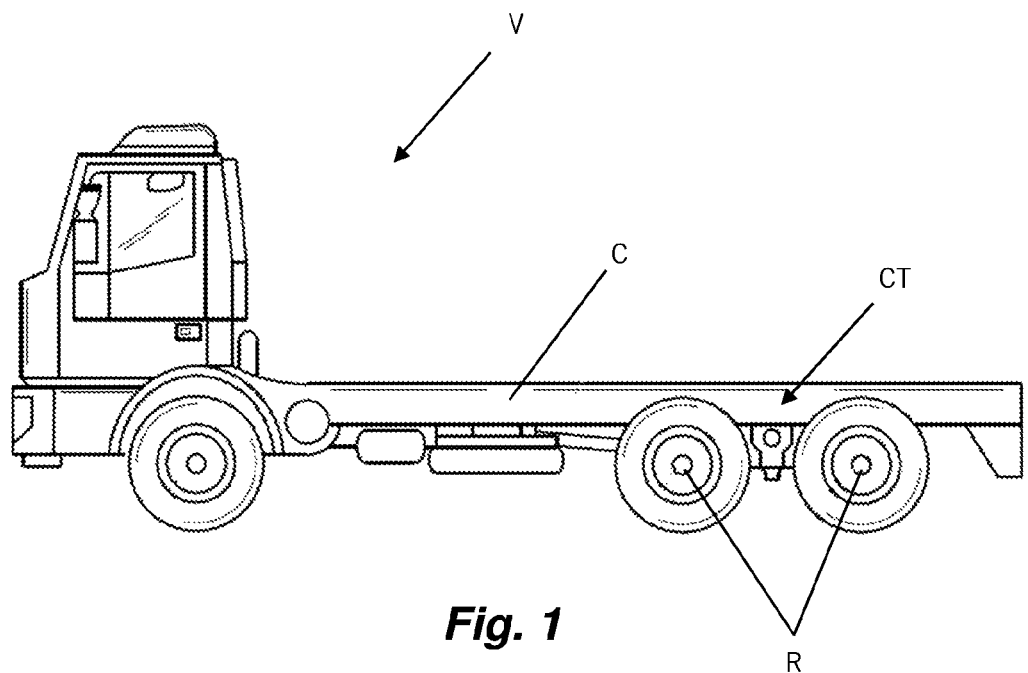
FIG. 1 is a side view of a commercial vehicle, such as a truck, having a double axle of the tandem type.
Figure 2:
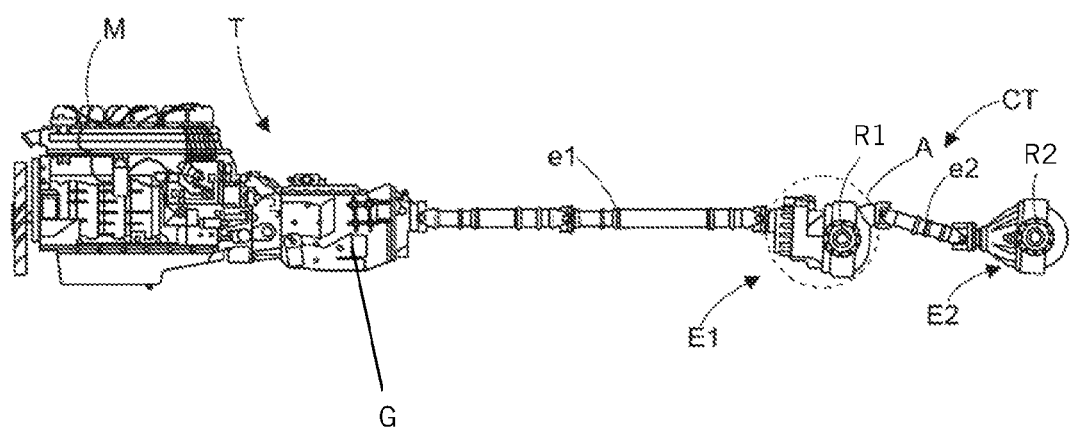
FIG. 2 is a side view of a traction assembly, including the engine, gear, with a cardan axle connected to the power transmission assembly of the first and second tag axles of the commercial vehicle.

For illustration purposes only and for a better understanding of the invention, as it may be of the knowledge of the persons skilled in the art, FIGS. 1 and 2 disclose, respectively, a good transportation vehicle (V) and its traction assembly (T). The vehicle (V) may be a truck, heavy trucks, two-axle trucks which may have combined traction axles. The invention is not limited to trucks, but also it may be used in civil construction machinery and mining, military vehicles, etc.

Despite of the fact that the present specification refers to tandem axles of the tandem type, i.e., two tractive axles, the present invention may be equally used in tandem axles of the tridem type, in which three tractive axles are placed. Thus, for clarifying purposes, and aiming to avoid any doubt, the present specification will simply refer to "tandem axles", which may be interpreted as tandem axles, tridem axles or any other configuration of assemblies having more than one tractive axle.

Therefore, considering the scope of the present invention, it can be said that these vehicle models (V) are comprised by at least one traction assembly for tandem axles (CT), such as the object of the present invention, and which is attached together with the chassis (C) of the vehicle (V) in order to transfer the power to the drive axles (R). Thus, as shown in FIG. 2, it can be said that the engine (M) generates power which is controlled by the gearbox (G) which is, then, transmitted by the first cardan axle (e1) to the transmission assembly (E1) of the first drive axle (R1). The power is further transferred to the second transmission assembly (E2) of the second drive axle (R) through a second cardan axle (e2) to the second drive axle (R2).

Said configuration of a transmission assembly as previously described is well known in the prior art.

The present invention addresses a power transmission assembly for tandem axles which is implemented in a differential responsible for distributing power between the drive axles (R1, R2) of a vehicle (V), from which, in cooperation with engagement/disengagement devices and locking device, enables changing the working configuration of the drive axles (R1, R2), over a configuration in which the first and the second drive axles (R1, R2) are driven, or a drive axle (R1 or R2) is driven and the other drive axle is not driven, or all the drive axles (R1 and R2) are not driven.

Figure 3A:
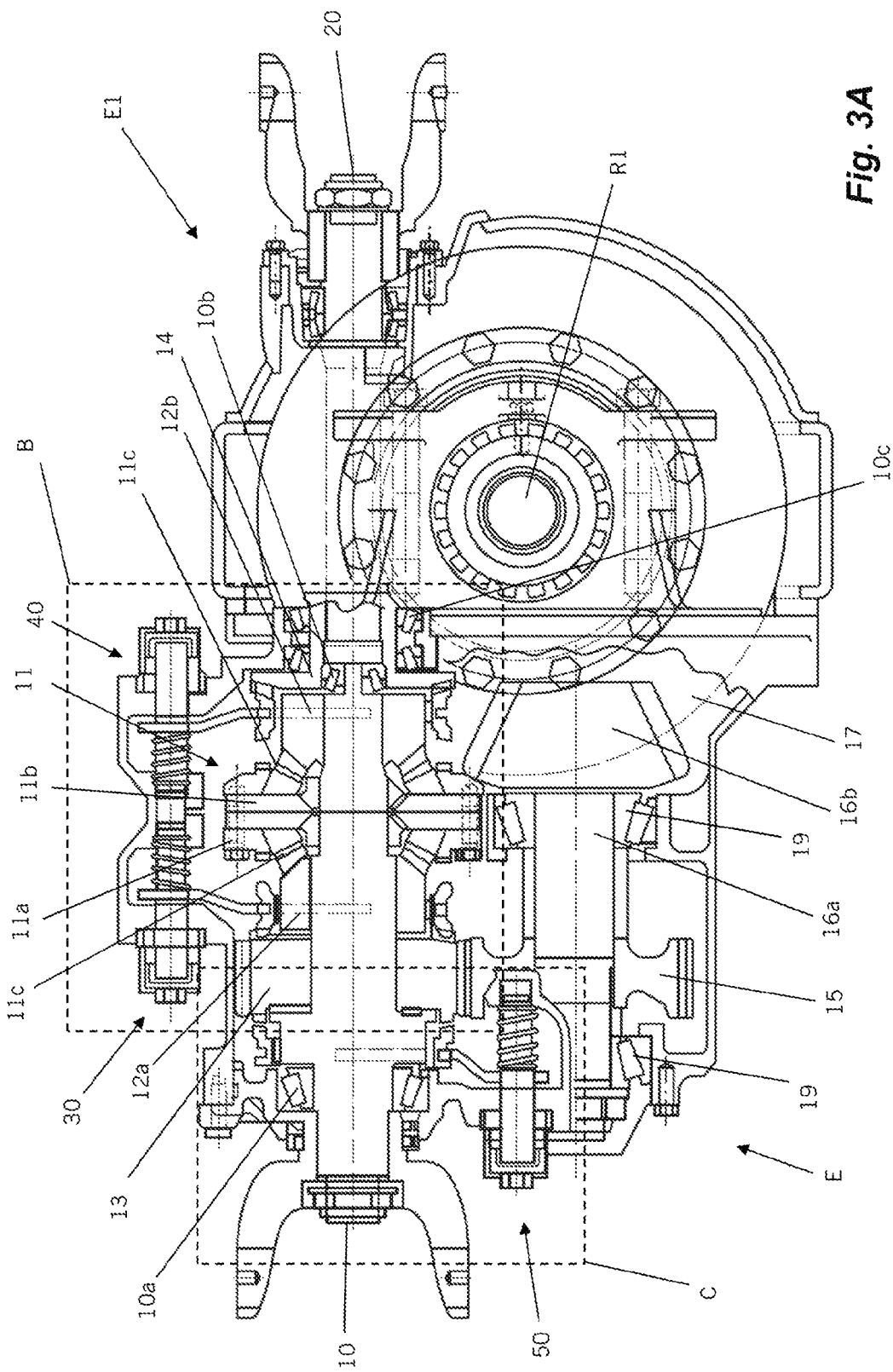
FIG. 3A is a side sectional view of the power transmission assembly for tandem axles, object of the present invention and, as indicated by detail "A" of FIG. 2.

Therefore, as shown by the accompanying drawings and, in particular FIG. 3A, the transmission assembly (E) for tandem axles (CT), object of the present invention, comprises an input axle 10 of power, which power is usually transmitted from a gear (G) through a Cardan axle (e1). The input axle 10 is attached to a differential 11 formed by a yoke 11b with planetary 11c which spin freely in relation to the axle of the yoke 11b. The yoke also comprises a housing 11a. Said planetary 11c are in contact with the intermediate sun gears 12a, 12b that are placed adjacently, respectively, to the transmission gear 13 and connection gear 14. Said transmission gear 13 is freely supported on mentioned input axle 10 and attached to the external diameter of the transfer gear 15 projected on a parallel axle 16a which comprises a pinion 16b responsible for the power transmission (torque and rotation) to the ring 17 of the drive axle (R) of the first differential of the transmission assembly (E1).

The first drive axle (R1) is attached to the first differential which is comprised by an assembly of conventional planetary, such as differentials with a pinion, a ring and a planetary assembly already known in the prior art, and which purpose is obtaining the proper transversal compensations between the wheels of the same drive axle.

Furthermore, said input axle 10 is supported on the housing of the differential of the transmission assembly by, for instance, on one side, on roller bearings 10a which are set on the housing of the transmission assembly, and on the other side, on roller bearings 10b concentrically placed to said connection gear 14, which is also supported on the housing of the transmission assembly on roller bearings 10c. Alternatively, said input axle 10 may be simply supported on lubricated bearings, i.e., without rollers themselves, or with any other known and equivalent technology for lifting said axle within the housing. Similarly, the parallel axle 16a is set on the housing of the differential on roller bearings 19.

Said connection gear 14 is also set in a way that it spins freely and in a concentric manner on the input axle 10 and is attached to the output axle 20 which transfers the power to the second transmission assembly (E2) through the second cardan axle (e2) for movement of the second drive axle (R2), which is also set with a second differential comprised by an assembly of conventional planetary, such as the models already known in the prior art and, and which purpose is obtaining the proper transversal compensations between the wheels of the same drive axle.

According to the present invention, and with the purpose of obtaining proper connections of said tandem axles, of the tandem or tridem type, the transmission assembly (E) comprises, further, engagement/disengagement devices 30, 40, and locking 50, which are responsible for providing the proper interconnections of the gears previously disclosed.

Figure 3B:
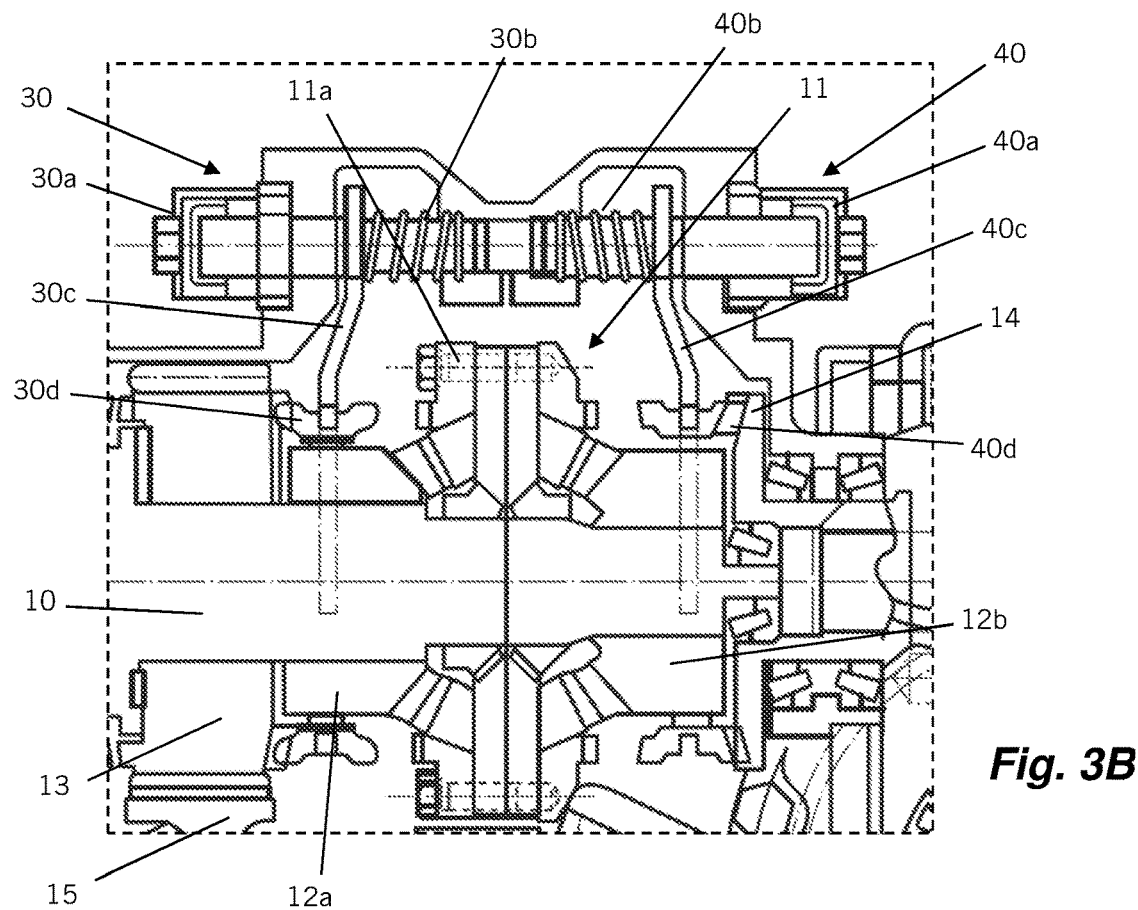
FIG. 3B is an amplified version of the attachable and detachable device for driving the power transmission assembly for tandem axles, according to the present invention and, as indicated by detail "B" of FIG. 3A.

As it is noted in the accompanying drawings, focusing on FIG. 3B, said attachable devices 30, 40, are comprised by an actuator 30a, 40a, such as, for instance, a pneumatic valve which, furthermore, may use the compressed air line of the vehicle (V) itself, which has an axle comprising a return mean 30b, 40b and, further, a fork 30c, 40c that attaches to a sleeve 30d, 40d having a spline in the internal diameter for connecting with the intermediate sun gears 12a, 12b, and tines on each one of its lateral faces in order to provide the interconnections between the gears of the power transmission assembly, respectively, the transmission gear 13 and the connection gear 14, and the housing 11a of the differential unit 11. Therefore, the housing 11a comprises an appropriate machining having tines on its lateral walls for connecting with each one of the sleeves 30d, 40d.

Figure 3C:
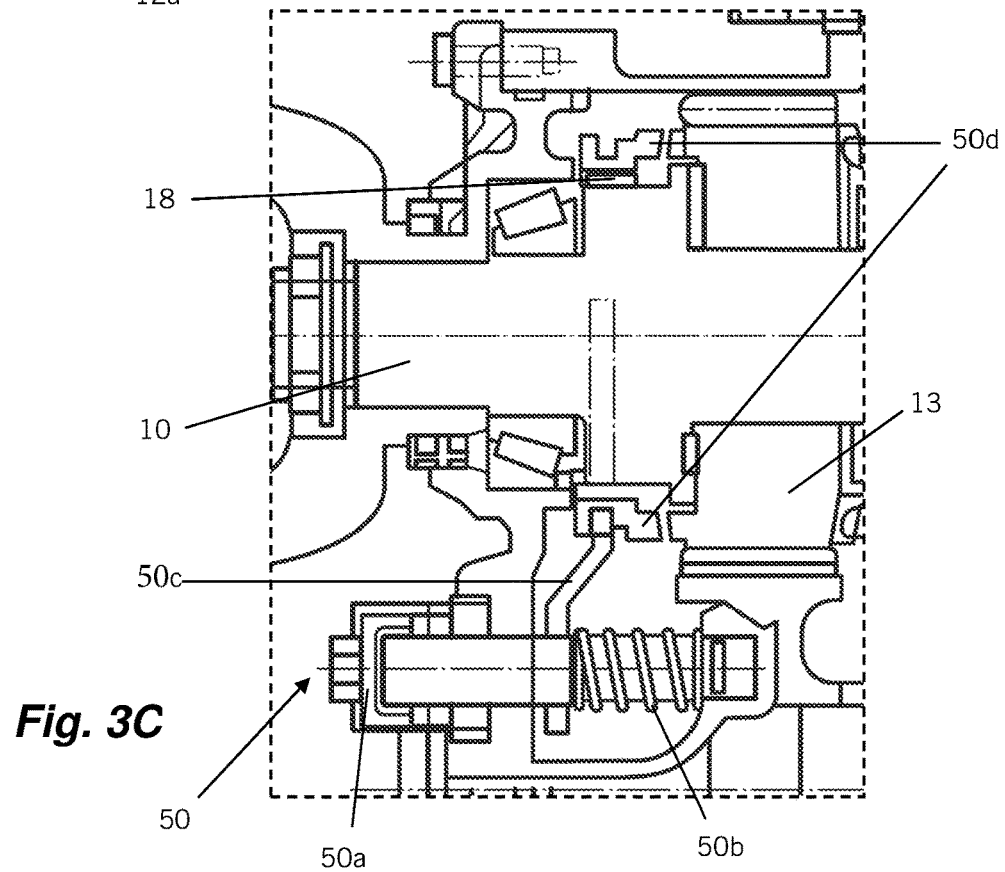
FIG. 3C is an amplified version of the locking device for driving the power transmission assembly for tandem axles, according to the present invention and, as indicated by detail "C" of FIG. 3A.

Particularly with reference to FIG. 3C, it is noted that the locking device 50, in a very similar way to the engagement/disengagement devices 30, 40, is comprised by an actuator 50a, which may also be, for instance, a pneumatic valve to use the compressed air line of the vehicle (V) itself. It has, further, an axle having a return mean 50b and a fork 50c which end is provided with a connecting sleeve 50d, having a spline in the internal diameter for connecting with the spline 18 of the input axle 10, and tines in one of its lateral faces for providing the interconnection with the transmission gear 13.

As it may be appreciated by the persons skilled in the art, said actuators 30a, 40a and 50a are preferably pneumatic valves, however, nothing keeps other means or drive devices from being equally used in the present invention, for instance, electrical or mechanical actuators, or a combination of technologies capable of providing the movement lengthwise of the forks 30c, 40c, 50c and, consequently, of said sleeves 30d, 40d, 50d.

Regarding, now, FIGS. 4, 5, 6, 7 and 8, they show the embodiment of the transmission assembly in different working conditions and, thus, in different acting situations of the respective engagement/disengagement devices 30, 40, and locking 50.

Figure 4:
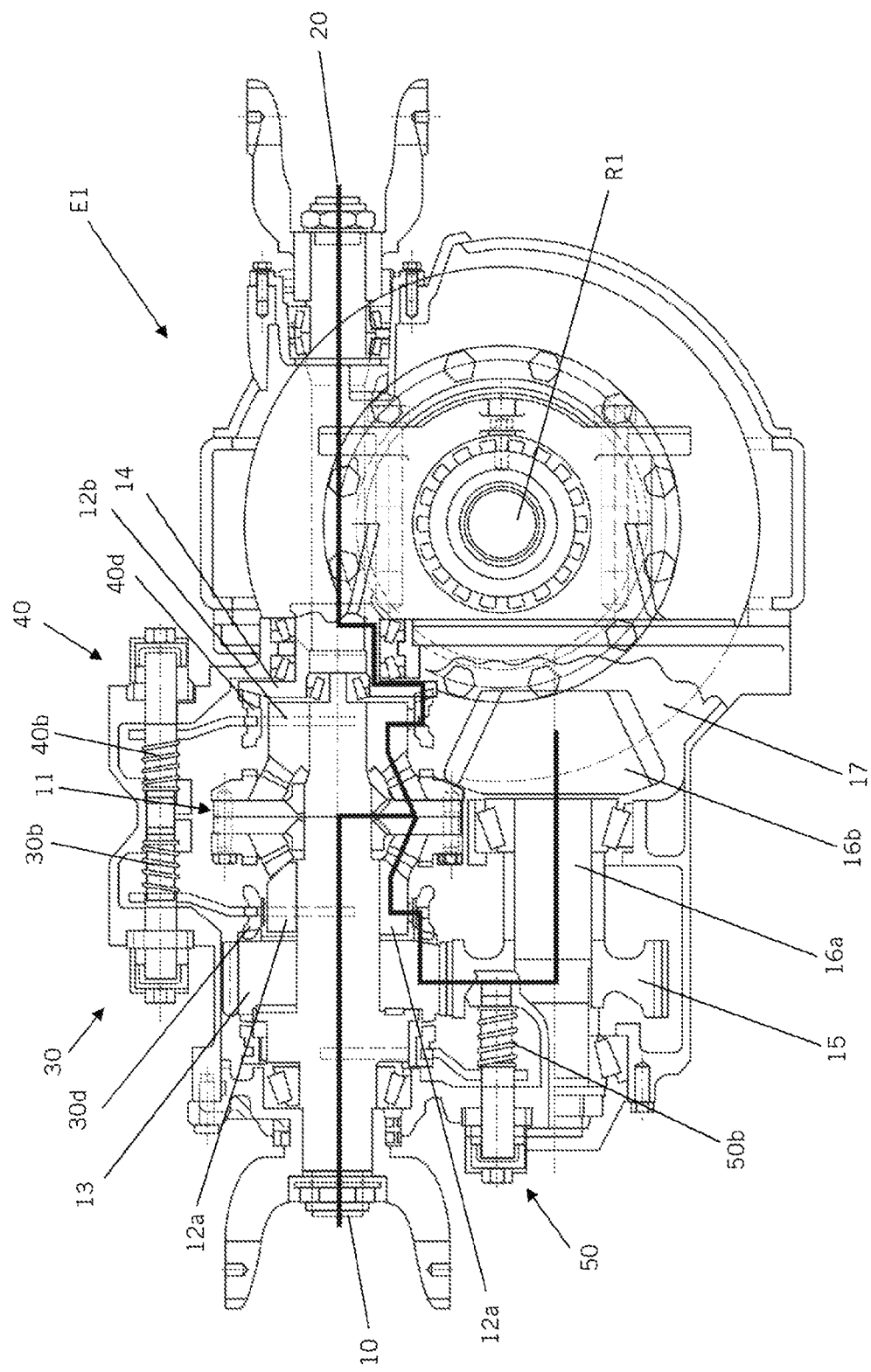
FIGS. 4, 5, 6, 7 and 8 are similar views to FIG. 3, however, in different working conditions of the power transmission assembly for tandem axles of the tandem or tridem type, according to the present invention.

First of all, regarding FIG. 4, the power transmission assembly for tandem axles is in the natural working condition in which are said engagement/disengagement devices 30, 40 properly attached and the locking device 50 is deactivated. In this condition, in which the return elements 30b, 40b are in their natural state (regarding the use of springs, position in which they are not compressed), and said sleeves 30d, 40d are attached, respectively, to the transmission gear 13 and to the connection gear 14, and there is no longitudinal locking between the transmission assemblies (E) and, for this reason, the differential unit 11 may proportionally divide the power between the output 20 towards the second differential E2 and the axle 16a which comprises the pinion 16b responsible for the power transmission to the ring 17 of the drive axle (R1) in the first differential E1. In other words, in an ideal condition, 50% of the power is transmitted to each differential, if there is no lack of grip in any of the wheels of the vehicle (V). As it might be appreciated by the persons skilled in the art, the differential assembly 11 enables a compensation of velocities between the first E1 and the second E2 differentials, such as, for instance, when the vehicle is making a curve or maneuvering.

For better clarifying, in the functioning condition of the power transmission assembly shown in FIG. 4, it is possible to note that the transmission assembly (E), object of the present invention, presents the following functioning:

the power is transmitted by the input axle 10 that provides the rotational movement of the differential unit 11, rotating the yoke 11b, and its housing 11a;

the differential unit 11 transfers the power towards the intermediate sun gears 12a, 12b e, consequently, rotating sleeves 30d, 40d, in a way that:

upon the intermediate sun gear 12a, it is set the sleeve 30d which tines of one of its lateral faces are attached to the transmission gear 13, which, on the other hand, transfers the power towards the transfer gear 15 which moves axle 16a with the pinion 16b, which, on the other hand, moves the ring 17 of the drive axle (R1); and upon the intermediate sun gear 12b is set mentioned sleeve 40d which tines of one of its lateral faces are attached to the connection gear 14 for moving the output axle 20 which transfers the power towards the differential (E2) of the second drive axle (R2).

Figure 5:
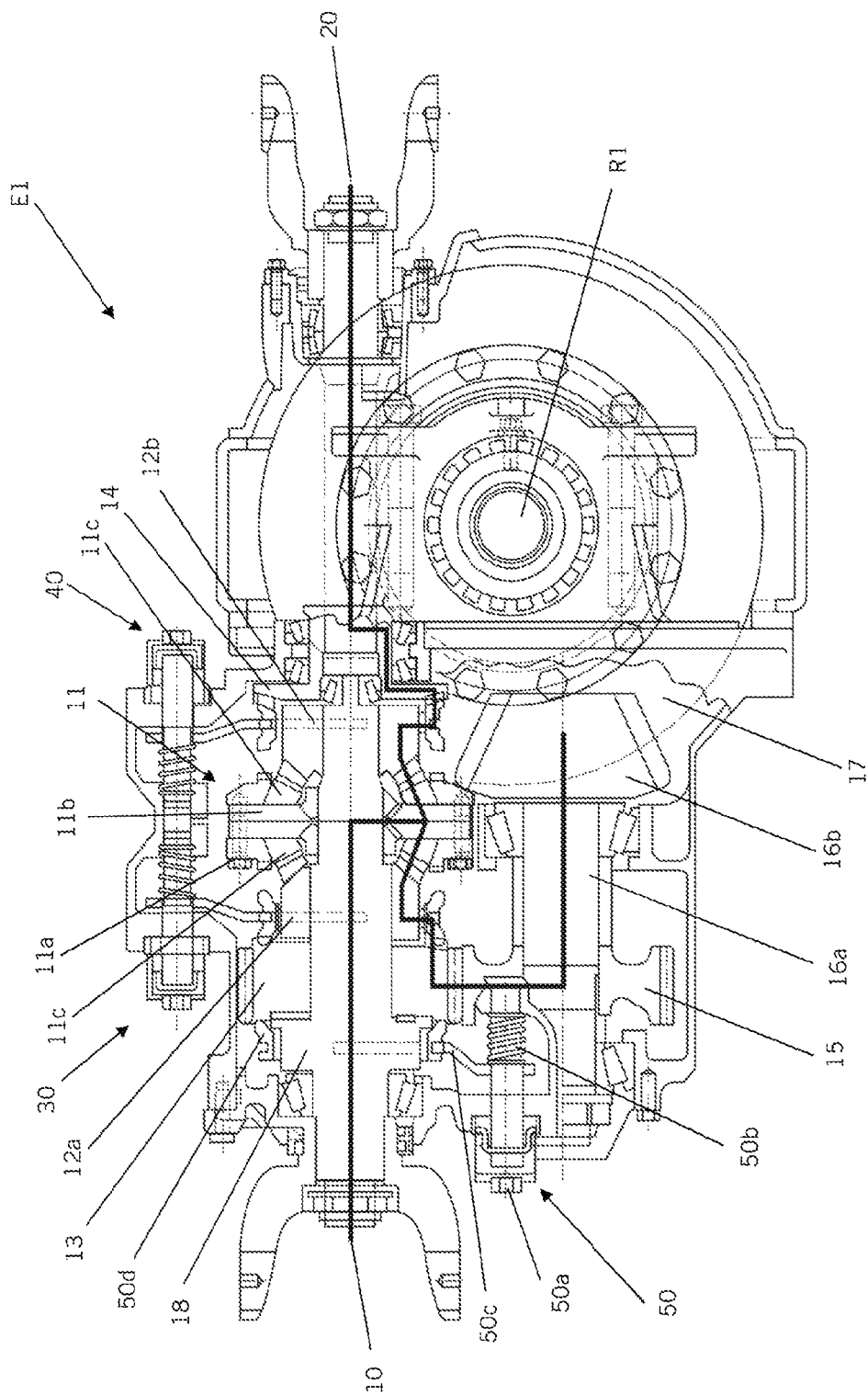

FIG. 5 shows the power transmission assembly in the longitudinal locking state, particularly, designed for situations in which the vehicle (V) is being conducted on grounds of low grip, risking to lose the traction in the wheels. In this case, the connection is made as disclosed in the specification regarding FIG. 4, having both axles R1 and R2 driven, however, the locking device 50 is also triggered, making the power in the input axle 10 to be integrally and equally transferred to the output axle 20 and to the axle 16a in parallel with the pinion 16b for the movement of the ring 17 of the drive axle (R1).

Thus, the actuator 50a of the locking device 50 is triggered, making the return element 50b to be compressed (in this case, a spring), and the fork 50c to be moved in order to enable the displacement of the sleeve 50d on the spline 18 of the input axle 10 until it obtains the connection of the tines of its lateral face in the tines of the lateral face of the transmission gear 13. As it may be noted, in the same way as it has been previously disclosed regarding the engagement/disengagement devices 30, 40, they remain in their natural state, in which said forks 30c, 40c continue to condition said sleeves 30d, 40d against the transmission gear 13 and connection gear 14.

However, according to FIG. 5, it is through the triggered locking of gear 13 by said sleeve 50d, that the locking of the yoke 11b occurs, through the sun gear 12a, making it any rotation compensation to be eliminated by the differential unit 11. Thus, the input axle 10 rotation will be the same rotation of yoke 11b, of planetary gears 11c, of the intermediate sun gears 12a, 12b, of the transmission gear 13 and the connection gear 14 and, consequently, of the output axle 20 and of the 16a axle with a pinion 16b for the movement of the ring 17 of the drive axle (R1) and, therefore, the power is transmitted in a non-variable range of 50% to the first R1 and to the second R2 axles.

Figure 6:
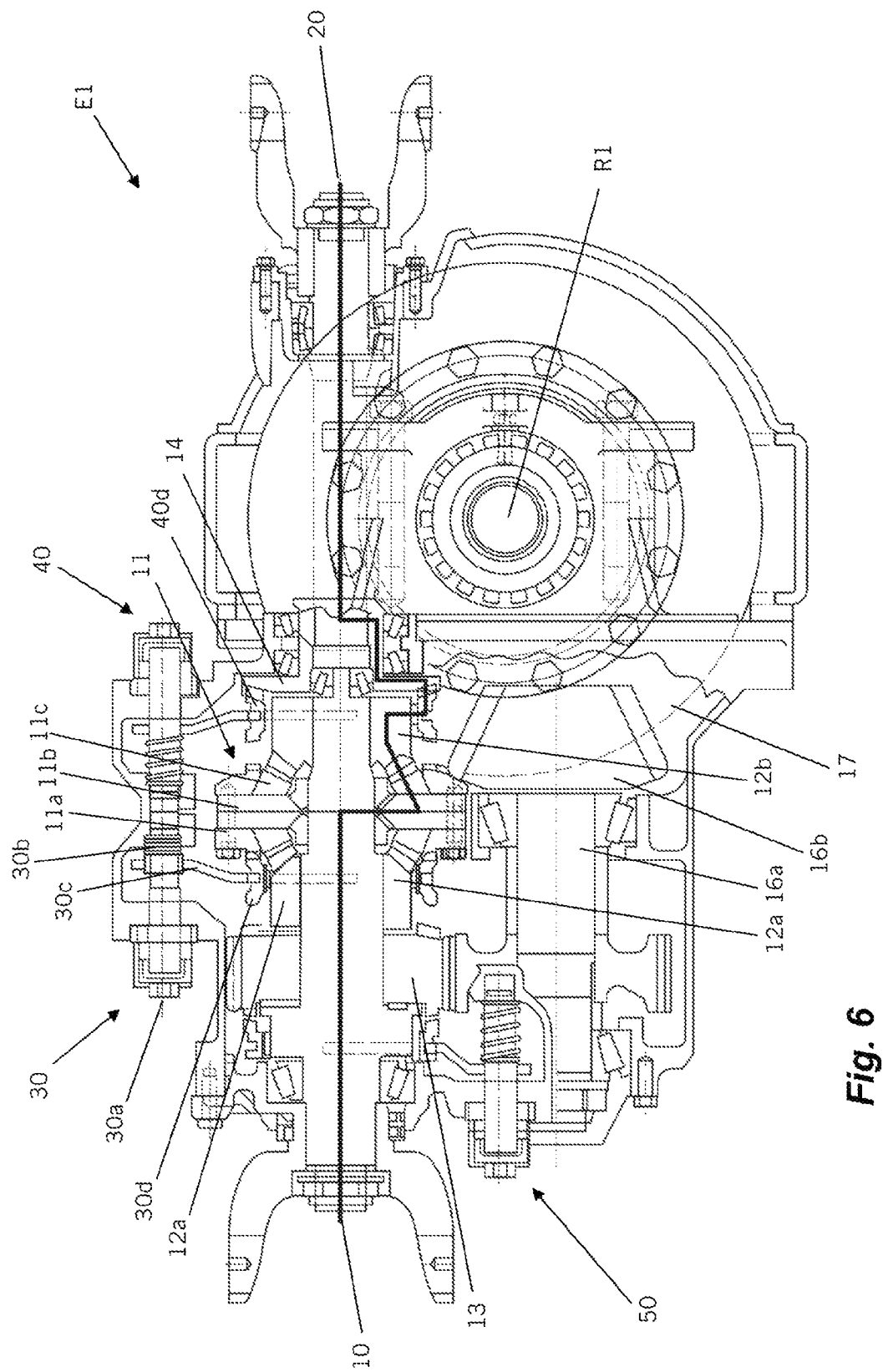

FIG. 6 shows a schematic view of the transmission assembly (E) in the state in which the engagement/disengagement device 30 is triggered, and the other engagement/disengagement devices 40 and locking 50 are deactivated, enabling the power transmission only to the second axle R2. As it can be noted, the actuator 30a of the engagement/disengagement device 30 is triggered, making the return element 30b to be compressed (in this case, a spring), and said fork 30c to be moved in order to enable the displacement of the sleeve 30d on the spline of the intermediate sun gear 12a, detaching the tines of one of its lateral faces of the transmission gear 13, and engaging to the tines of its other lateral face in the tines of the fixation housing 11a of the yoke 11b. In this condition, as it may be noted, the first axle traction is off, the sleeve 30d locks the yoke 11b and, consequently, the planetary 11c of the yoke, eliminating the effect of the differential unit 11 and the second sleeve 40d continues attached to the connection gear 14 transmitting all the power only towards the output axle 20.

Therefore, for illustration purposes, it is possible to note that the transmission assembly (E), according to the present invention, presents the following functioning in the condition shown in FIG. 5:

the power enters through the input axle 10 that provides the rotational movement of the differential unit 11, the differential unit 11 transfers the power towards the intermediate sun gears 12a, 12b, in a way that:

the intermediate sun gear 12a is rotated jointly to the axle and, since the sleeve 30d is detached from the transmission gear 13, there is no power transference towards axle 16a of the pinion 16b and, consequently, the movement of the ring 17 of the first drive axle (R1) does not occur; and on the intermediate sun gear 12b, is the sleeve 40d of the engagement/disengagement device 40, and which tines of one of its faces remain attached to the connection gear 14 for movement of the output axle 20 that transfers 100% of the power towards the differential or transmission assembly (E2) of the second drive axle (R2).

In this condition, in which the engagement/disengagement device 30 is triggered, the drive axle (R1) of the first transmission assembly (E1) will be detached and, thus, it will enable the vehicle (V) driver to lift the first drive axle (R1) and be able to achieve savings during the movements without a load, avoiding the wear and tear of the first drive axle (R1) assembly.

Figure 7:
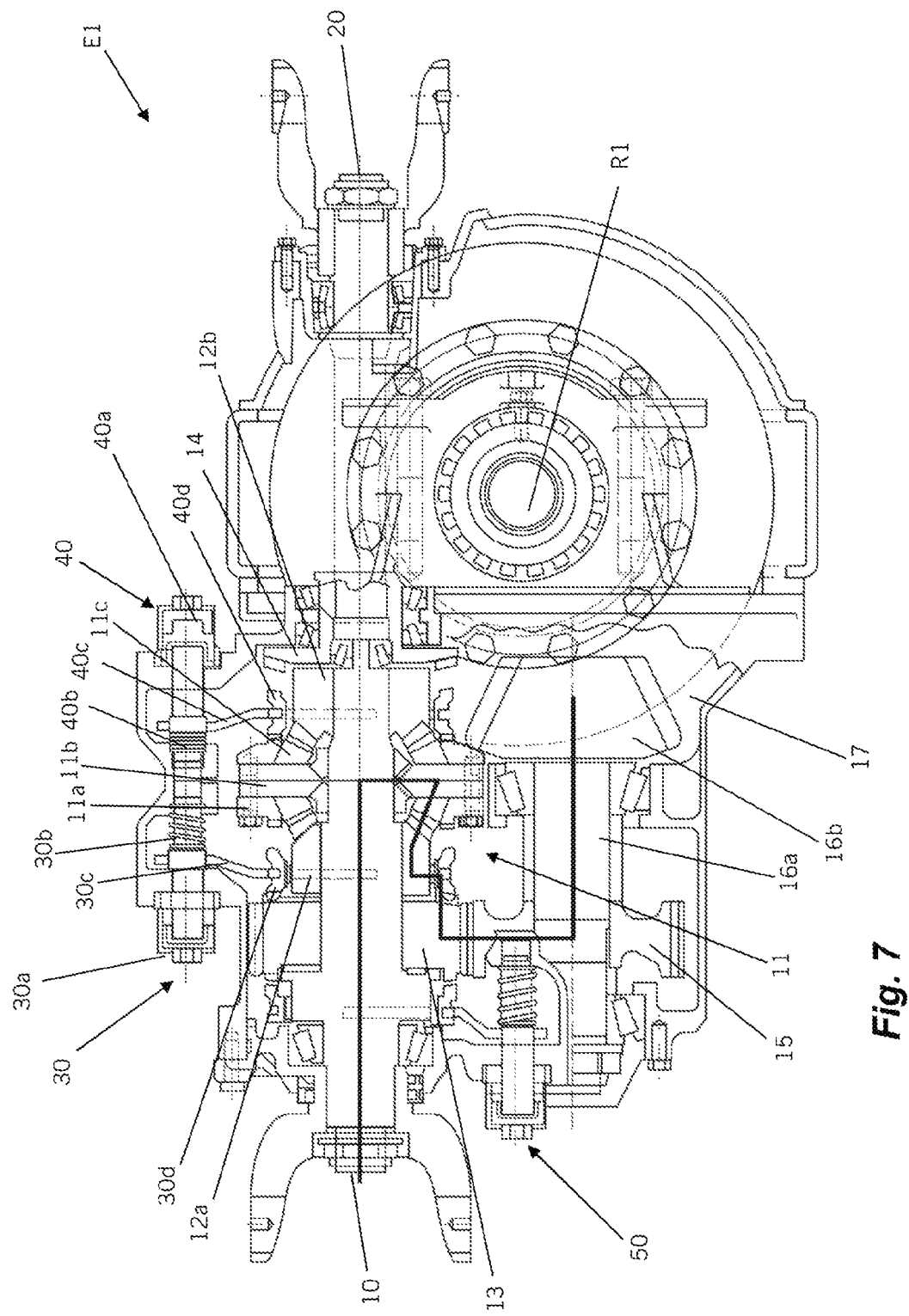

FIG. 7 shows a schematic view of the power transmission assembly in an exactly contrary condition to that one shown in FIG. 6, i.e., only the first drive axle (R1) is triggered and driven. In this situation, the engagement/disengagement device 30 is triggered, and the other engagement/disengagement devices 40 and locking 50 are deactivated. As it can be noted, the actuator 40a of the engagement/disengagement device 40 is triggered, making the return element 40b to be compressed (in this case, a spring), and the fork 40c to be moved in order to enable the displacement of the sleeve 40d on the spline of the intermediate sun gear 12b, detaching the tines of one of its lateral faces of the connection gear 14, and engaging to the tines of its other lateral face of the sleeve 40d in the tines of the fixation housing 11a and of the yoke 11b. In this condition, as it may be noted, the traction in the output axle 20 is off, the sleeve 40d locks the yoke 11b and, consequently, the planetary 11c of the yoke, eliminating the effect of the differential unit 11, and the sleeve 30d is attached to the transmission gear 13 and, thus, all the power is transferred to only the parallel axle 16a, to the pinion 16b through the transfer gear 15, and, consequently, providing the movement of the ring 17 of the first drive axle (R1).

Therefore, it is possible to note that the transmission assembly, in the condition as it is shown in FIG. 7, presents the following functioning:

the power is transmitted through the input axle 10 that provides the rotational movement of the differential unit 11, the differential unit 11 transfers the power towards the intermediate sun gears 12a, 12b, in a way that:

upon the intermediate sun gear 12a, it is set the sleeve 30d which tines of one of the lateral faces are attached to the transmission gear 13, which transfers the power towards the transfer gear 15 which moves the axle 16a of the pinion 16b, which, on the other hand, moves the ring 17 of the first drive axle (R1); and the intermediate sun gear 12b is rotated jointly to the input axle and locks the yoke 11b, since said sleeve 40d is detached from the connection gear 14 and, thus, there is no power transfer towards the output axle 20 and, consequently, there will be no power transfer, for instance, towards the transmission assembly (E2) of the second drive axle (R2).

In this condition, in which the engagement/disengagement device 40 is triggered, the transmission assembly of the second axle (E2) will be detached and, thus, the vehicle (V) driver will be able to lift the second drive axle (R2) of the tandem axles assembly (CT).

Figure 8:
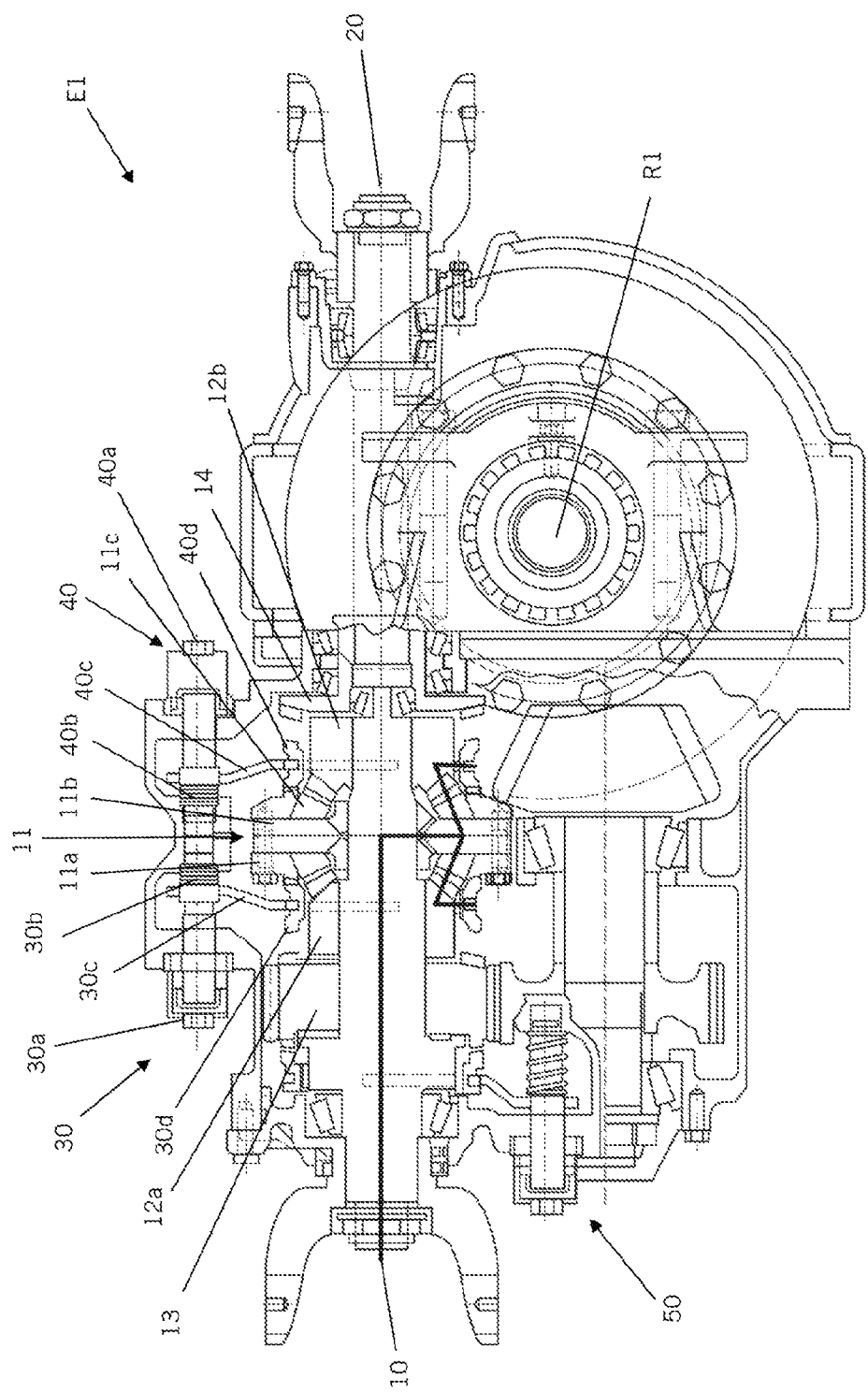

FIG. 8 shows the power transmission assembly, object of the present invention, in the fully detached state, i.e., a situation in which the engagement/disengagement devices 30, 40 are triggered and the locking device 50 is deactivated. In this condition, the power in the input axle 10 is retained by the differential unit 11, i.e., both the drive axle (R1) of the first assembly, and the drive axle (R2) of the second assembly are detached and free. As illustrated, the triggering of the actuators 30a, 40a of the engagement/disengagement devices 30, 40 make the return elements 30b, 40b to be compressed (in this case, springs), and the forks 30c, 40c to move in order to provide the displacement of sleeves 30d, 40d, which detach from the transmission gear 13 and connection gear 14, engaging to the differential unit 11 through the engaging of their tines of its sides to the housing 11a and the yoke 11b.

Therefore, it is possible to note that the power transmission assembly, in the condition as it is shown in FIG. 8, presents the following functioning:

the power is transmitted through the input axle 10 that provides the rotational movement of the differential unit 11;

the differential unit 11 transfers the power towards the intermediate sun gears 12a, 12b, which are freely rotated, since the sleeve 30d is detached from the transmission gear 13 and the sleeve 40d is detached from the connection gear 14.

As it might be appreciated by the persons skilled in the art, the simultaneous trigging of the engagement/disengagement devices 30, 40 makes the power not to be transmitted towards the transmission gear 13 and connection gear 14. Therefore, the input axle 10 does not have any interconnection with the first drive axle (R1), neither with the output axle 20. In this case, the tandem axles assembly (CT) does not have traction).

It is important to highlight that according to another functionality of the present invention, the full detaching of the vehicle (V) traction, as shown in FIG. 8, may be useful to use the power of the cardan axle (e1) as a power take-off.

Although the illustrative specification above and the accompanying drawings make reference to engagement/disengagement devices 30, 40, and locking device 50, which natural resting positions are deactivated, i.e., without the respective attachment with the motor gears and with the return element in its natural state, a person skilled in the art may be able to appreciate and conduct the proper adaptations and, in this case, the mere positioning inversion of the respective components, for instance, the return elements 30b, 40b, 50b, forks 30c, 40c, 50c so that the natural and resting positions of these devices be attached to the motor gears (transmission 13 and connection 14) and, when triggered, they will provide the detaching of said gears, or vice versa.

In other words, the sleeves 30d, 40d may be attached to the differential unit 11, just like the sleeve 50d may be attached to said transmission gear 13 when the respective actuators 30a, 40a, 50a are deactivated.

The present invention also addresses a drive system of a power transmission assembly for tandem axles, such as of the tandem or tridem type, which is comprised by at least one engagement/disengagement device 30 formed by an actuator 30a working in cooperation with a return element 30b for providing the axial movement of a fork 30c that is connected to a sleeve 30d provided with a spline within its internal diameter for connecting to an intermediate sun gear 12a, and tines on its lateral faces for providing interconnections with the transmission gear 13 and the housing 11a of the differential unit 11 of the power transmission assembly for tandem axles.

Furthermore, according to the present invention, the drive system of a power transmission assembly for tandem axles, object of the present invention, comprises an engagement/disengagement device 40 and a locking device 50.

Said engagement/disengagement device 40 is formed, basically, by an actuator 40a working in a cooperative way with a return element 40b to provide the axial movement of a fork 40c that connects to a sleeve 40d provided with a spline within its internal diameter for connecting with an intermediate sun gear 12b, and tines on its lateral faces for providing interconnections with the connection gear 14 and the housing 11a of the differential unit 11 of the power transmission assembly for tandem axles. On the other hand, the locking device 50 is comprised by the actuator 50a, working in cooperation with a return element 50b for axially move a fork 50c which is connected to a sleeve 50d provided with a spline within its internal diameter for connecting with a corresponding spline on the input axle 10, and tines on one of its lateral faces for providing interconnection with the transmission gear 13 of the power transmission assembly for tandem axles.

Therefore, according to the present invention, the drive system of the tandem axles assembly for vehicles is used in the input 10 axle in which a differential unit 11 is set, capable of providing the distribution of the power between the drive axles (R1, R2) of the vehicle through the triggering of said engagement/disengagement devices 30, 40 and locking device 50 and, thus, it becomes possible to choose between a configuration in which the first and second drive axles (R1, R2) are driven, or one drive axle ((R1, R2) is driven and the other drive axle (R1, R2) is not driven, or all the drive axles (R1, R2) are not driven.

Moreover, the present invention also addresses a vehicle for goods transportation (V), which comprises a mechanical structure (T) formed by a chassis (C), in which is projected an engine (M) responsible for generating power that is controlled by the gearbox (G), and, then, transmitted by the first cardan axle (e1) towards the power transmission assembly having a drive system, such as defined by the present invention, in a way that it enables a working configuration of the drive axles, over a configuration in which the first and second drive axles (R1, R2) are driven, or another drive axle (R1, R2) is driven and the other drive axle (R1 or R2) is not driven, or all the drive axles (R1, R2) are not driven.

In face of the above, it becomes evident that the power transmission assembly for tandem axles, of the tandem or tridem type, object of the present invention, the driver of the vehicle (V) is able to provide a rotation scheme of the axles to be lifted during the movements in which he is not transporting goods, i.e., the driver may effectively choose which axle he wishes to lift, in order to obtain savings during movements. Therefore, as it might be appreciated by the persons skilled in the art, the present invention is capable of providing significate economic advantages for self-employed drivers and transportation companies, in addition to compensate the wear and tear between the drive axles (R1, R2), preventing only one of them from overloading.

Lastly, upon all that has been previously disclosed, it is important to make it clear that the present revelation aims to disclose and define, in an exemplificative way, said embodiments of the power transmission assembly for tandem axles used in loads transportation vehicles or other kinds of vehicles. Therefore, as it might be understood by the persons skilled in the art, several modifications and constructive combinations of equivalent elements are possible without, this way, escaping from the protection scope defined by the accompanying claims.

The invention claimed is:

1. A power transmission assembly for tandem axles of a vehicle, the assembly comprising:
   an input axle;
   a plurality of engagement/disengagement devices;
   a locking device; and
   a differential unit being set for power distribution between a first drive axle and a second drive axle each of the vehicle, which, in cooperation with the engagement/disengagement devices and the locking device, selectively enables each of the following configurations of the first and second drive axles, namely, the first and the second drive axles are driven, one of the drive axles is driven and the other drive axle is not driven, and all the first and second drive axles are not driven, the power transmission assembly being configured for being directly associated with the first drive axle and not the second drive axle and selectively for not communicating a drive power to the second drive axle.

2. The power transmission assembly for tandem axles of claim 1, wherein:
   the power transmission assembly further comprises:
      a transmission gear;
      a connection gear;
      a plurality of intermediate sun gears;
      a transfer gear; and
      a parallel axle;
   said differential unit comprises:
      a housing;
      a yoke accommodated in the housing; and
      a plurality of planetary gears freely placed in relation to an axle of said yoke and in contact with the intermediate sun gears which are adjacently placed, respectively, to the transmission gear and the connection gear, wherein:
   said transmission gear is freely supported on the input axle and is connected to an external diameter of the transfer gear placed on the parallel axle having a power transmission pinion of a ring of a drive axle ring;
   said connection gear being set freely on the input axle and is attached to an output axle; and
   said transmission gear and the connection gear are interconnected and locked through the attachment/detachment devices, and the locking device.

3. The power transmission assembly for tandem axles of claim 2, wherein said input axle is placed and supported, on one side on a first roller bearings which are placed on the housing of the transmission assembly, and on the other side on a second roller bearings placed together with the connection gear, which is also supported on the housing of the transmission assembly through a third roller bearings.

4. The power transmission assembly for tandem axles of claim 2, wherein said input axle is placed on lubricated bearings within the housing of said transmission assembly.

5. The power transmission assembly for tandem axles of claim 1, wherein said attachment/detachment devices are comprised by an actuator having an axle provided with a return mean and, additionally, a fork, which attaches to a sleeve having a spline in the internal diameter for connecting with the intermediate sun gears, and tines on each one of its lateral faces for interconnections between the transmission gear and the connection gear, and the housing of the differential unit.

6. The power transmission assembly for tandem axles of claim 1, wherein
    said locking device has:
        an actuator;
        a sleeve;
        a return mean coupled to the actuator; and
        a fork that is attached to the sleeve, the sleeve being provided with a first spline in the internal diameter for connecting with a second spline of the input axle, and the sleeve has tines on one of its lateral faces for interconnection with the transmission gear.

7. The power transmission assembly for tandem axles of claim 2, wherein the attachment/detachment devices each includes a sleeve, in a deactivated state of the attachment/detachment devices, tines of lateral faces of said sleeves being in contact, respectively, with the transmission gear and the connection gear.

8. The power transmission assembly for tandem axles of claim 2, wherein the attachment/detachment devices each includes a sleeve, in a deactivated state of the attachment/detachment devices tines of lateral faces of said sleeves being in contact with the differential unit.

9. The power transmission assembly for tandem axles of claim 1, wherein the locking device includes a sleeve, in a deactivated state of the locking device said sleeve being in contact with a transmission gear.

10. The power transmission assembly for tandem axles of claim 2, further comprising a plurality of actuators coupled to the attachment/detachment devices and the locking device, the actuators are pneumatic, hydraulic, electrical, electronic or a combination of these technologies.

11. The power transmission assembly for tandem axles of claim 10, wherein said actuators of the attachment/detachment devices and the locking device are pneumatic and connected to a compressed air system of the vehicle.

12. A drive system of a power transmission assembly for tandem axles, the drive system comprising:
    at least one attachment/detachment device including:
        a sleeve;
        a return element;
        a fork; and
        an actuator working in cooperation with the return element for axial movement of the fork that connects to the sleeve, the sleeve having a spline within its internal diameter for connecting to an intermediate sun gear, and the sleeve having tines on its lateral faces for selectively providing direct interconnections with a transmission gear and a housing of a differential unit of the power transmission assembly for tandem axles.

13. The drive system of a power transmission assembly for tandem axles of claim 12, further comprising:
    an other attachment/detachment device; and
    a locking device.

14. The drive system of a power transmission assembly for tandem axles of claim 13, wherein said other attachment/detachment device includes:
    an other return element;
    an other fork;
    an other sleeve; and
    an other actuator working in cooperation with the other return element for axial movement of the other fork that connects to the other sleeve, the other sleeve having a spline within its internal diameter for connecting to an intermediate sun gear, and the other sleeve having tines on its lateral faces for providing interconnections with a connection gear and the housing of the differential unit of the power transmission assembly for tandem axles.

15. The drive system of a power transmission assembly for tandem axles of claim 13, wherein said locking device comprises:
    an other return element;
    an other fork;
    an other sleeve; and
    an other actuator working in cooperation with the other return element for axial movement of the other fork that connects to the other sleeve having a spline within its internal diameter for connecting to a corresponding spline, placed in the input axle, and the other sleeve having tines on one of its lateral faces for providing an interconnection with the transmission gear of the power transmission assembly for tandem axles.

16. A vehicle for transporting goods, comprising;
    at least one assembly of tandem axles including:
        a plurality of drive axles responsible for supporting wheels with tires of the vehicle; and
        at least one power transmission assembly with a drive system, the drive system comprising:
            at least one attachment/detachment device including:
                a sleeve;
                a return element;
                a fork; and
                an actuator working in cooperation with the return element for axial movement of the fork that connects to the sleeve, the sleeve having a spline within its internal diameter for connecting to an intermediate sun gear, and the sleeve having tines on its lateral faces for selectively providing direct interconnections with a transmission gear and a housing of a differential unit of the power transmission assembly for tandem axles.

17. The vehicle for transporting goods of claim 16, wherein the vehicle is a truck, a heavy truck, or a two-axle truck having combined traction axles of a tandem or a tridem type.

* * * * *